March 16, 1926.  1,576,575
F. U. CONARD
COMBINED TYPEWRITING AND COMPUTING MACHINE
Filed June 13, 1924  3 Sheets—Sheet 1

Fig.1.

Inventor
Frederick U. Conard
by O. C. Stickney
Attorney

March 16, 1926.

F. U. CONARD 1,576,575

COMBINED TYPEWRITING AND COMPUTING MACHINE

Filed June 13, 1924  3 Sheets-Sheet 3

Inventor
Frederick U. Conard
by B.C. Stickney
Attorney

Patented Mar. 16, 1926.

1,576,575

UNITED STATES PATENT OFFICE.

FREDERICK U. CONARD, OF BROOKLYN, NEW YORK, ASSIGNOR TO UNDERWOOD COMPUTING MACHINE COMPANY, OF NEW YORK, N. Y., A CORPORATION OF NEW YORK.

COMBINED TYPEWRITING AND COMPUTING MACHINE.

Application filed June 13, 1924. Serial No. 719,744.

*To all whom it may concern:*

Be it known that I, FREDERICK U. CONARD, a citizen of the United States, residing in Brooklyn Borough, in the county of Kings, city and State of New York, have invented certain new and useful Improvements in Combined Typewriting and Computing Machines, of which the following is a specification.

This invention relates to state-controlling means for computing machines, and particularly for combined typewriting and computing machines such as the Underwood bookkeeping machine.

In the Underwood bookkeeping machine, a motor is automatically tripped by the movement of the carriage from the units column of each computing zone to actuate the general operator, which is effective to run the set-up number, if any has been set up, into the register or registers and also to put the machine in a state of addition regardless of its previous state. Subtraction is automatically obtained in predetermined zones by means of adjustable cams on the carriage, which engage and actuate subtraction-setting mechanism. A machine of this character is disclosed, for example, in the patent to Thornton, No. 1,283,360, dated October 29, 1918.

Where changes in the schedule of operations are frequent, the carriage-carried cams for automatically controlling a set schedule of operations has been found to be very satisfactory. It has been found in practice, however, that, in many lines of business, machines when once set for a given schedule may run for years without any change in the schedule being desired. In such a case, the ease with which the cams may be removed and placed at various positions on the carriage is objectionable rather than otherwise, since it sometimes results in confusion and errors, due to the accidental or erroneous misplacement of the cams.

The use of carriage-carried cams, moreover, calls for a multiplicity of parts and sensitive mechanisms which must all be actuated by the typewriter carriage in its letter-feeding movement. Inasmuch as the source of power used to actuate the carriage and said mechanisms is the usual carriage-propelling spring, it sometimes happens that the power available is not adequate, so that the operation of the machine is not satisfactory.

It is an object of the present invention to overcome the above-mentioned disadvantages and objections. To this end, provision is made of a state-controlling rotary cam connected for operation by the motor-propelled general operator to be advanced one step by each actuation thereof, and contoured to produce, through suitable connections to the subtraction-setting mechanism, the sequence of operations desired. Since the motor is tripped to operate the general operator at the end of each computing zone, the cam is advanced a step for each computing zone traversed. The connections to the subtraction-setting bar, including a cam-follower, are so constructed that the subtraction-setting bar will be released and therefore effective to set the machine for subtraction when a low part of the cam is engaged by the follower, and the subtraction-setting bar will be maintained ineffective, thus causing the machine to remain in its normal state of addition when a high part of the cam is effective.

The connection from the general operator to the control-cam, for operating the latter step by step, may include a pawl and ratchet, in which case the ratchet will be provided with a number of teeth equal to the number of operations in the fixed schedule, or to a multiple of the number of such operations.

In order to permit the schedule of operations to be changed when desired, the state-controlling cam and its ratchet-wheel are made removable from the machine, so that the cam may be replaced by a cam of different contour and the ratchet-wheel may, if necessary, be replaced by a wheel having a different number of teeth. Provision is also made of means for adjusting the throw of the ratchet-operating pawl in accordance with the number of ratchet-teeth.

An indicator may be used to show that the state-controlling cam is properly set with respect to the columns. This indicator comprises a scale-band arranged to run over two pulleys at the front of the machine, one of the pulleys being driven by a shaft connected to the state-controlling cam. The scale-band has indices "S" and "A" arranged upon it according to the schedule of the machine, a whole number of cycles being included on the band. The band is visible through an extended opening in the front of the machine, so that the whole schedule may be seen by the operator, and a pointer is provided to indicate the particular setting which is effective.

All of the state-controlling mechanism and the indicator therefor are carried by the base-plate of the machine which forms part of the usual computing-machine stand, and are unconnected to the computing or typewriting mechanism. The computing mechanism may therefore be lifted off the stand at will to permit ready access to the state-controlling mechanism when it is desired to change the schedule of operations.

It will be seen that by the above-outlined arrangement, the carriage-propelling mechanism is relieved of the necessity of actuating the state-controlling mechanism, and, further, that the state of the machine is independent of the particular writing zone. It may be desirable, for example, to carry out a schedule of operations covering several lines of typing, in which addition may be desired in a certain zone of the first line and subtraction in the same zone of the second line. Such a schedule may be carried out automatically by the use of the present invention.

The novel state-controlling mechanism may also be useful in a computing machine which has no traveling carriage.

Other features and advantages will hereinafter appear.

In the accompanying drawings.

In the Underwood bookkeeping machine as disclosed, for example, in the patent to Thornton referred to above, alphabet-keys 10 and numeral-keys 11 depress key-levers 12, which are connected to swing type-bars up to print against the front face of a platen mounted on a carriage.

In addition to operating the types to print the numbers, the numeral-keys 11 also index or set up preliminary representations of the digits in the computing mechanism. To do this, each of the numeral-keys from "1" to "9" is provided with a depending stem 13 which engages an arm (not shown) on a rock-shaft 14 arranged to operate a linkage 15. There is one of these linkages 15 for each of the numeral-keys from "1" to "9", and each of them is engaged by an arm carried by the accordant one of the rock-shafts 14. The lower reaches 16 of the linkages 15 are employed for setting index-pins 17 carried by denominational pin-bars 18. The pins 17 are normally out of alignment with the lower reaches 16, so that if any reach were depressed, it would pass idly between two transverse rows of the pins.

In order to enable the setting of the pins 17, a denomination-selecting mechanism is provided which advances the pin-bars to their pin-setting positions seriatim as the carriage progresses in letter-feed direction, beginning with the pin-bar 18 of highest denomination. Said selecting mechanism comprises a denomination-selector (not shown) mounted on the carriage, which engages and actuates, one after another, denominational jacks (not shown) to thrust downward a series of thrust-rods 19, which are connected at their lower ends through levers 20 and transposition mechanism 21 to act upon the appropriate pin-bars.

After all of the digits of a number have been indexed on the pin-bars 18, it is necessary to run up these numbers on the dial-wheels 22 of the registers. For this purpose, each of the dial-wheels 22 is provided with a gear (not shown) engaged by a rack 23 carried by the accordant one of the denominational pin-bars 18.

A general operator 24 is provided with a cross-bar 25, which, at the forward motion of the general operator, engages with such of the index-pins 17 as have been set, giving the pin-bars 18 forward movements according to the particular pins set and corresponding to the numeral-keys actuated in the columns to which the pin-bars correspond.

The general operator may be actuated by a motor 26 housed beneath the base-plate 27 of the machine. Said motor may be tripped manually by depression of a key 28, which, through a lever 29, rocks a lever 30 to raise a stop-pin 31 that both closes a switch to set the motor into operation and makes effective a one-revolution clutch (not shown) for giving the general operator 24 a single forward and backward movement.

The general operator 24 may also be reciprocated automatically at the movement of the carriage forward from the units column of each computing zone, and it is with this mode of operation that the present invention principally has to do. This automatic actuation of the general operator 24 is accomplished by providing abutments at suitable points on the carriage to engage a motor-trip (not shown) and rock the latter to draw on a link 32. This link 32 rocks a bell-crank 33 to withdraw a latch 34 from above a lever 35, pivoted at 36, to permit the lever to be rocked by a spring 37. The forward end of the lever 35 overlies a projection 38 upon a downwardly-extending link 39 and depresses the latter to rock the lever 30, which, through the pin 31, starts the motor 26, as already described. At the forward stroke of the general operator, a cam surface 40 on the general operator engages a finger on the forward end of the lever and raises it to restore the lever to the control of the latch. The motor having been tripped, however, continues its operation until a full reciprocation of the general operator has been effected.

The machine is constructed to effect subtraction by the complemental method; that is, provision is made of means for altering the connections of the rock-shafts to the linkages to cause the complements of the digits typed to be indexed on the index-pins 17 of the pin-bars 18. The subtraction-setting means are like those disclosed in the patent to Minton, No. 1,280,065, granted September 24, 1918. A subtraction-setting key 41 is arranged to be thrust to the rear to cause a link 42 to rock a lever 43 to withdraw a latch 44 from engagement with a notch 45 in a subtraction-setting bar 46. Upon the withdrawal of the latch 44, a spring 47 draws the subtraction-setting bar 46 to the rear, and the bar in turn swings a bell-crank, comprising arms 49 and 50 and a rock-shaft 48, to perform the several operations necessary to set the machine for subtraction in the manner fully disclosed in the patent to Thornton referred to above. After a subtraction setting and during the running in of a subtraction computation, the cross-bar 25 of the general operator engages a lug 52$^a$ on the subtraction bar 46, thus restoring the bar to the control of the latch 44, which at that time is urged upward by a spring 53$^a$ connected to the lever 43, and so setting the mechanism to a state of addition for the next operation. The mechanism thus far described is like that disclosed in the Thornton and Minton patents.

In accordance with one embodiment of the present invention, provision is made of power-actuated means for automatically controlling the state of the computing mechanism. The general operator 24 is connected, through a link 51, a bell-crank lever 52 and a second link 53, to a rock arm 54 pivoted on a vertical shaft 55 that is supported by the base-plate 27. A pawl 56 carried by the arm 54 is pressed by a spring 57 into engagement with a ratchet-wheel 58 removably mounted on the shaft, to advance the ratchet-wheel step by step, the arrangement being such that the ratchet-wheel is fed a tooth-space at each reciprocation of the general operator 24. A cam 59 is also removably mounted on the shaft and connected to be driven step by step by the ratchet-wheel 58. A follower 60 slidingly supported by a guide 60$^a$, is pressed by a spring 61 into engagement with the periphery of the cam 59, and is connected through a crank 62 to oscillate a rock-shaft 63 mounted in bearings 64 on the base-plate 27. The rock-shaft 63 is connected through a second crank 65 to thrust forward a slide 66 which is arranged to engage a downwardly-extending arm 67 of the lever 43 and thrust it forward to withdraw the latch 44 from engagement with the subtraction-setting bar 46, to permit the subtraction-setting bar to be actuated by the spring 47 in the manner previously described to set the machine for subtraction. The arrangement is such that the latch 44 is held out of engagement with the subtraction-setting bar whenever a low part of the periphery of the cam 59 permits the follower 60 to move toward the center of the cam while the slide 66 is withdrawn to permit engagement of the latch with the subtraction-setting bar whenever a high part of the cam 59 is effective.

Figure 1:
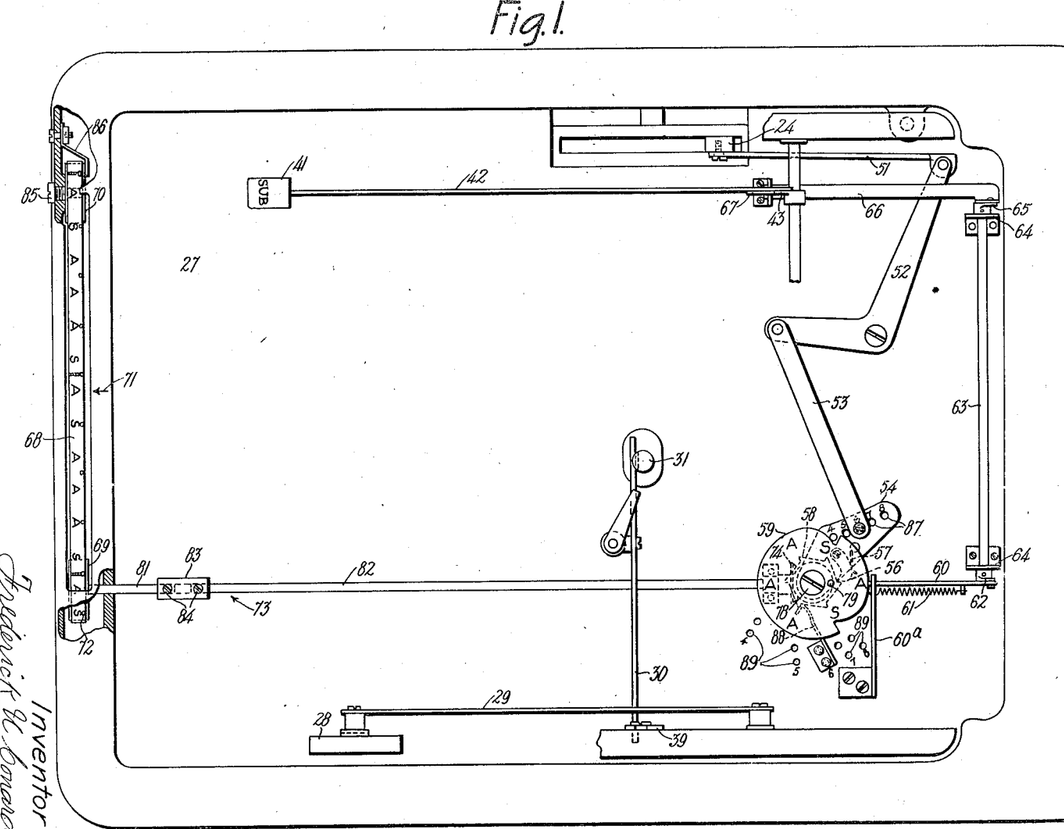
Figure 1 is a plan view of the machine-stand having the novel mechanism of the present invention applied thereto.

It will now be seen that, with the parts positioned as shown in Figure 1, the machine will be in its normal state of addition. At the end of the next computing zone, the motor will be automatically tripped to reciprocate the general operator 24 so that the ratchet-wheel 58 will be advanced a tooth-space, bringing a low part of the cam 59 opposite the follower 60 and permitting the follower to approach the center of the cam, thus setting the machine to a state of subtraction. At the leaving of the next computing zone, the machine will be restored to addition in a similar manner, and due to the contour of the cam and the length of the feeding steps, succeeding operations will cause the schedule indicated in Figure 4 to be carried out.

Indicating means for informing the operator as to the state of the machine are provided, such means including an indicator-band 68, mounted upon two pulleys 69 and 70 at the front of the machine, and visible through an extended opening in the machine frame. A pointer 71 may be provided to indicate the state of the machine at any given time. The band 68 is connected to the pulley 69 through sprocket-teeth 72, and this pulley is connected through a shaft 73 and a bevel gear 74 on said shaft to be driven from a bevel gear 75 which is mounted on the vertical shaft 55 and is actuated by the ratchet-wheel 58, also on the vertical shaft 55.

Figures 2, 3, 4, 5, 6, 7, 8:
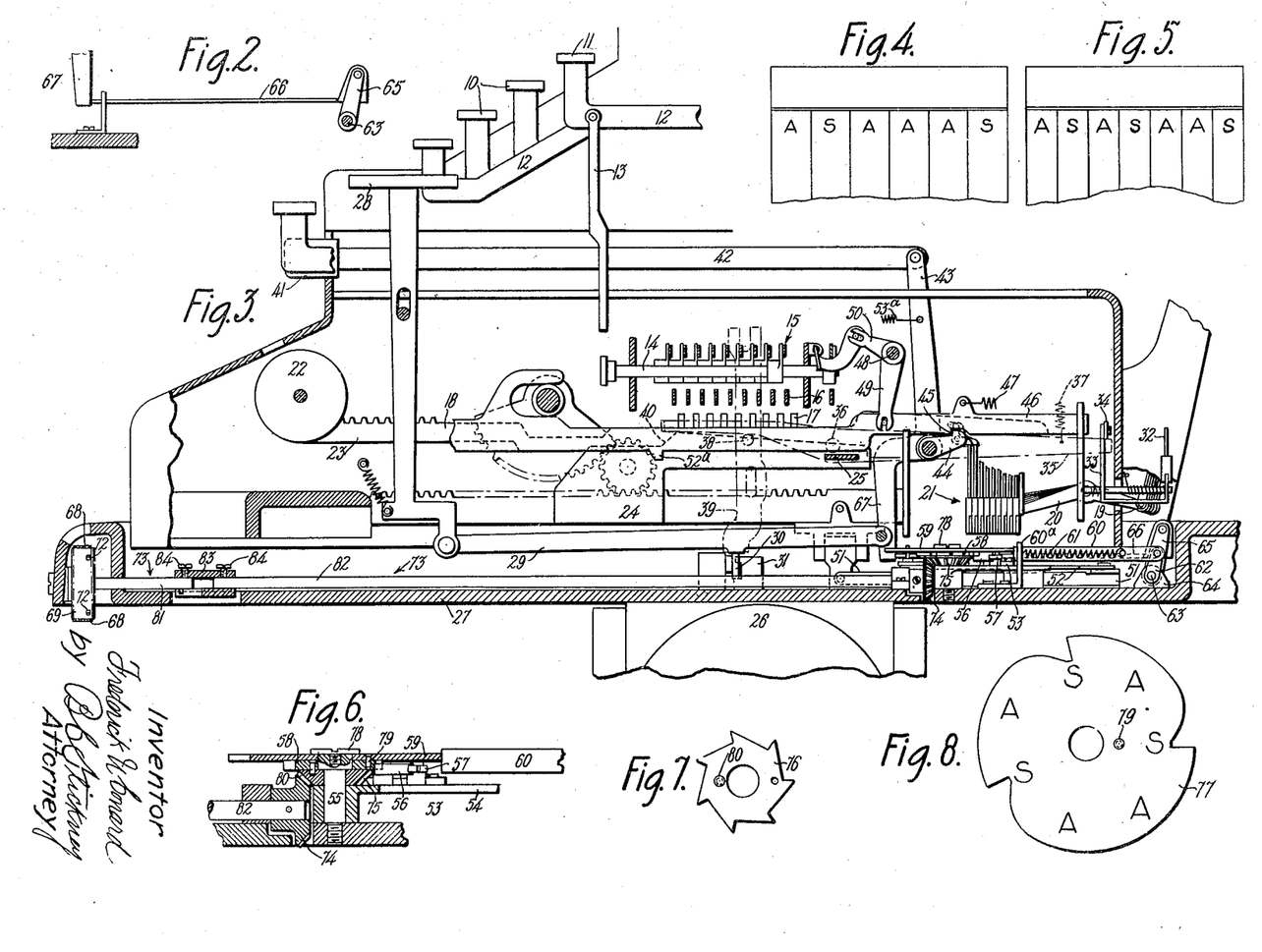
Figure 2 is a sectional detail view showing a part of the connection from the state-controlling cam to the subtraction-bar-releasing lever.
Figure 3 is a fragmentary sectional view showing the novel mechanism and so much of the old mechanism as is necessary to an understanding of the invention.
Figure 4 is a diagrammatic view of a work-sheet indicating the schedule of operations automatically effected by the mechanism disclosed in Figures 1 and 9.
Figure 5 is a diagrammatic view of a work-sheet indicating the schedule of operations automatically effected by the substitution of the ratchet and cam of Figures 7 and 8.
Figure 6 is a sectional detail view showing the control-cam follower and a part of the connections from the control-cam to the indicator-band.
Figure 7 shows a seven-toothed ratchet-wheel for use in carrying out a seven-operation schedule such, for example, as that indicated in Figure 5.
Figure 8 shows a cam contoured to carry out the schedule of operations indicated in Figure 5.

Should it be desired to change the schedule of operations, for example, to a seven-operation schedule, such as that indicated in Figure 5, it will be necessary to remove the six-toothed ratchet-wheel 58 and the cam 59 from the machine and to substitute therefor a seven-toothed ratchet-wheel 76, such as the one shown in Figure 7, and a cam 77 suitably contoured for operation by and with the seven-toothed ratchet-wheel 76, and for carrying out the schedule indicated. In order to make this substitution easy, the state-controlling mechanism is all mounted on the base-plate 27 of the machine, and is not positively connected with any of the computing mechanism, so that the computing and the writing mechanism can be readily lifted off of the base-plate 27 to give access to the state-controlling mechanism. The ratchet 58 and the cam 59 are held in place on the shaft 55 by a screw 78 which may be readily withdrawn. The cam 59 is provided with a pin 79 to engage a recess of the ratchet 58 to effect a driving connection between these members, and the ratchet 58 is provided with a pin 80 to engage a recess in the bevel gear 75 to effect a driving engagement between the ratchet 58 and bevel gear 75. It will be seen that by this ararngement the cam 59, or the cam and the ratchet 58, may be readily removed to permit the substitution of similar elements for carrying out a different schedule.

It will be understood, of course, that the substitution of a new state-controlling cam whereby the schedule is changed requires also the substitution of a different indicator-band to correspond to the changed schedule. To enable this to be done, the shaft 73 is made in two sections 81 and 82, which are connected through a splicing sleeve 83, to which they are secured by binding screws 84. When it is desired to substitute a new indicator-band, the forward binding screw 84 is turned to loosen the short forward shaft-section 81 to permit it with its pulley 69 to be moved to the rear, so that the old band 68 may be removed from it and the appropriate one put in its place. The opposite pulley 70 is supported upon a pivot-screw 85, the head of which projects at the front of the machine. By turning this screw 85, it may be withdrawn from the pulley 70 to permit the pulley 70 to be moved down away from its operative position to facilitate the changing of the band. A guide 86 normally bears against the inner face of the pulley to retain it in place upon the pivot-screw.

Provision is made for varying the feeding steps of the rock-arm 54 in accordance with the tooth-space intervals of different ratchet-wheels. For this purpose, the arm 54 is povided with a series of holes 87 at different distances from the axis of the arm, so that the throw of the arm effected by the uniform movement of the link 53 may be varied. Theses holes have indices to show which hole shall be used for connecting the link and the arm when a ratchet-wheel of a given number of teeth is employed. A spring-detent 88 for co-operating with the ratchet-wheels to prevent overthrow thereof is similarly adjustable by means of indexed threaded openings 89 in the base-plate.

Figure 9:
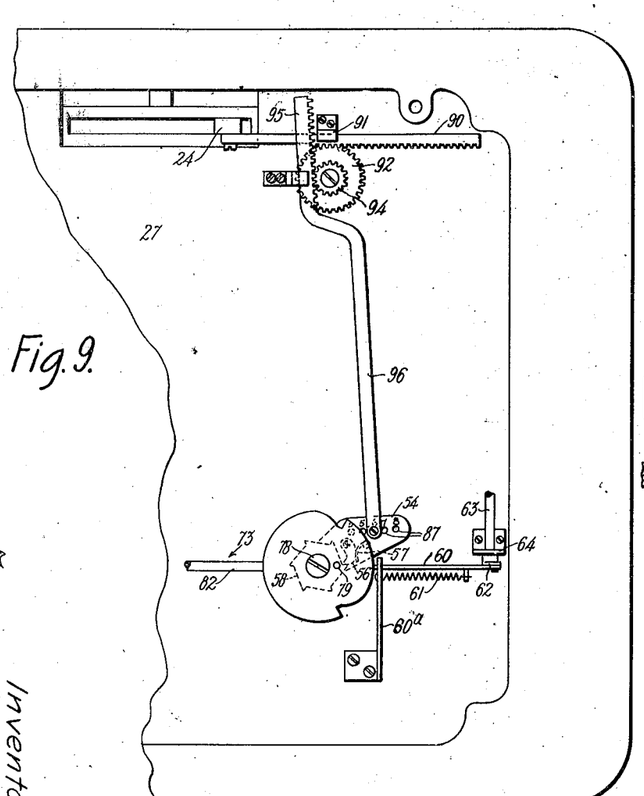
Figure 9 is a fragmentary view, similar to Figure 1, showing the control-cam connected for operation from the general operator by means of gearing.
Figure 10:
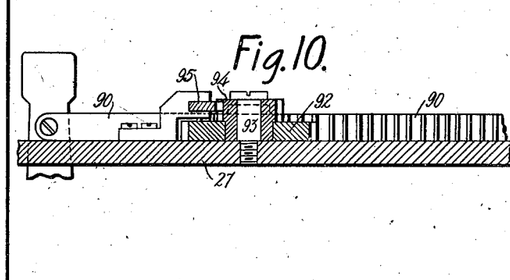
Figure 10 is a detail sectional view showing the gears forming part of the connection between the general operator and the control-cam of Figure 9.

In Figures 9 and 10 a different form of connection from the general operator 24 to the state-controlling mechanism is disclosed. In this form, a rack 90 extends rearwardly from the general operator 24 beneath a guide 91 to mesh with a gear 92 rotatable about a vertical shaft 93 mounted on the base-plate 27. A second smaller gear 94, fast to the first gear 92, transmits motion through a rack 95 to a link 96 which is connected to reciprocate the arm 54. The effect of the link 96 on the state-controlling mechanism is the same as the effect of the link 53 upon it in the form of the invention previously described, and the state-controlling mechanism is otherwise unaltered.

Variations may be resorted to within the scope of the invention, and portions of the improvements may be used without others.

Having thus described my invention, I claim:

1. In a typewriting and computing machine, the combination with state-setting mechanism and a general operator, of state-controlling mechanism including a ratchet-driven cam operated by the general operator to cause a definite schedule of computations to be carried out.

2. In a typewriting and computing machine, the combination with a traveling carriage and a motor-driven general operator, of power means started by the carriage for actuating the general operator at the conclusion of each computing zone traversed in letter-feed direction by the carriage, and state-controlling mechanism including ratchet-driven cams actuated by the general operator to carry out a fixed schedule of computations.

3. In a typewriting and computing machine, the combination with a traveling carriage, computing mechanism, and a motor for driving the computing mechanism, of means for setting the motor into operation at the conclusion of each computing zone traversed by the carriage in letter-feed direction, and state-controlling mechanism including ratchet-driven cams actuated by the motor and arranged to automatically vary the state of the computing mechanism.

4. In a typewriting and computing machine, the combination with a traveling carriage and computing mechanism including a ratchet-driven cam-actuated state-setting means, of power means for actuating the ratchet-driving means arranged to be set into operation by the traveling carriage, but deriving its power independently thereof for changing the computing mechanism from a state of addition to a state of subtraction.

5. In a machine of the kind described, the combination with a general operator, computing mechanism, and state-setting mechanism, of state-controlling means arranged to carry out a schedule of operations in predetermined sequence, and means including a pawl-driven ratchet actuated by the general operator to advance the state-controlling means one stage of its schedule at very computing operation.

6. In a machine of the kind described, the combination with a general operator, computing mechanism, and state-setting mechanism, of state-controlling means arranged to carry out a schedule of operations in predetermined sequence, means including a pawl-driven ratchet actuated by the general operator at each operation thereof to advance the state-controlling means one stage of its schedule, and means to produce idle operations of the general operator between computations to enable the operative to cause computations to be effected in a different order from that determined by the fixed schedule of the state-controlling means, when desired.

7. In a typewriting and computing machine, the combination with a traveling carriage, computing mechanism, and state-setting mechanism, of a general operator, means for actuating the general operator, and means actuated by the general operator for controlling the state-setting mechanism, including a ratchet-driven schedule cam, a reciprocating cam follower, and connections from the cam follower to the state-setting mechanism to control the latter.

8. In a typewriting and computing machine, the combination with a traveling carriage, computing mechanism, and state-setting mechanism, of a general operator, power means for actuating the general operator, means for setting the power means into operation, and means actuated by the power means for controlling the state-setting mechanism, comprising a schedule cam, a cam driver in the form of a ratchet-wheel having a tooth for each operation carried out by the schedule of the cam, a cam follower, and connections from the cam follower to the state-setting mechanism to control the latter.

9. In a typewriting and computing machine, the combination with a traveling carriage, computing mechanism, and state-setting mechanism, of a general operator, power means for actuating the general operator, means for setting the power means into operation, and means actuated by the power means for controlling the state-setting mechanism, including a ratchet-driven schedule cam, a reciprocating cam follower, and connections from the cam follower to the state-setting mechanism to control the latter.

10. In a typewriting and computing machine, the combination with a traveling carriage, computing mechanism, and state-setting mechanism comprising a subtraction-setting bar and a latch normally holding the subtraction-setting bar ineffective, of a general operator, power means for actuating the general operator, means for setting the power means into operation, and means actuated by the power means for controlling the state-setting mechanism including ratchet-driven schedule cams, a cam follower, and connections from the cam follower to the state-setting mechanism to withdraw the latch from the subtraction-setting bar when the cam follower moves in one direction.

11. In a typewriting and computing machine, the combination with a traveling carriage, computing mechanism, and state-setting mechanism comprising a subtraction-setting bar and a latch normally holding the subtraction-setting bar in an ineffective position, of a general operator, means actuated by the general operator at every operation thereof to move the subtraction-setting bar to said ineffective position, power means for actuating the general operator, means for setting the power means into operation, and means actuated by the power means for controlling the state-setting mechanism, including ratchet-driven schedule cams, a cam follower, and connections from the cam follower to the state-setting mechanism to hold the latch away from the subtraction-setting bar if the next computation is to be subtraction, but to permit the latch to detain the subtraction-setting bar in its ineffective position if the next computation is to be addition.

12. In a typewriting and computing machine, the combination with a traveling carriage, computing mechanism, and state-setting mechanism, of a general operator, power means for actuating the general operator, means for setting the power means into operation, and means actuated by the power means for controlling the state-setting mechanism, comprising a schedule cam, a ratchet-wheel for driving the cam, an oscillatory pawl-carrying arm for driving the ratchet-wheel, a link for driving the oscillatory arm, and connections from the cam to the state-setting mechanism to control the latter, the ratchet-wheel and cam being removable for replacement by a cam of different contour and a ratchet-wheel having a different number of teeth, and means for adjusting the amplitude of the oscillations of the oscillatory arm in accordance with the number of teeth of the ratchet-wheel in use.

13. In a typewriting and computing machine, the combination with a traveling carriage, computing mechanism, and state-setting mechanism, of a general operator, power means for actuating the general operator, means for setting the power means into operation, and means actuated by the power means for controlling the state-setting mechanism, comprising a schedule cam, a ratchet-wheel for driving the cam, an oscillatory pawl-carrying arm for driving the ratchet-wheel, a link for driving the oscillatory arm, connections from the cam to the state-setting mechanism to control the latter, the ratchet-wheel and cam being removable for replacing by a cam of different contour and a ratchet-wheel having a different number of teeth, and means for adjusting the amplitude of the oscillations of the oscillatory arm in accordance with the number of teeth of the ratchet-wheel in use, and comprising a series of openings in the oscillatory arm and means for connecting the link to the arm at any one of said openings.

14. In a typewriting and computing machine, the combination with a traveling carriage, computing mechanism, and state-setting mechanism, of a general operator, power means for actuating the general operator, means for setting the power means into operation, means actuated by the power means for controlling the state-setting mechanism, comprising a schedule cam, a ratchet-wheel for driving the cam, an oscillatory pawl-carrying arm for driving the ratchet-wheel, a link for driving the oscillatory arm, connections from the cam to the state-setting mechanism to control the latter, the ratchet-wheel and cam being removable for replacement by a cam of different contour and a ratchet-wheel having a different number of teeth, and means for adjusting the amplitude of the oscillations of the oscillatory arm in accordance with the number of teeth of the ratchet-wheel in use, a detent to control the exact feeding of the ratchet-wheel, and means to adjust the detent in accordance with the number of teeth of the ratchet-wheel in use.

15. In a typewriting and computing machine, the combination with computing mechanism, of a general operator, a subtraction-setting bar, means to move the subtraction-setting bar to an ineffective position in the latter part of each computing operation, a latch normally positioned to detain the subtraction-setting bar in ineffective position, so that the machine will be maintained in a state of addition, state-controlling mechanism including ratchet-driven schedule cams operated by the general operator to cause said latch to be ineffective and to permit it to be effective in predetermined sequence, and manually-operable means to render the latch ineffective and thereby to set the machine for subtraction at the will of the operator in contravention of the schedule of the state-controlling mechanism.

16. In a typewriting and computing machine, the combination with a traveling carriage, computing mechanism, and state-setting mechanism, of a general operator, power means for actuating the general operator, means for setting the power means into operation, and means actuated by the power means for controlling the state-setting mechanism, comprising a shaft, an oscillatory operating arm on the shaft, a pawl carried by the arm, a ratchet-wheel rotatably mounted on the shaft and driven step by step by the oscillatory arm and pawl, a schedule cam, means for effecting a driving connection between the ratchet-wheel and the cam, but not constructed to hold the ratchet-wheel and cam to each other, removable means for fixing the positions of the ratchet-wheel and the cam longitudinally of the shaft, and connections from the cam to the computing mechanism, the arrangement being such that the cam or the cam and the ratchet-wheel can be readily removed and replaced by other similar elements for carrying out different schedules of operations.

17. In a typewriting and computing machine, the combination with a machine stand, of a computer removably mounted on the stand, and state-controlling mechanism including a schedule cam mounted on the stand, the arrangement being such that the state-controlling mechanism is located in co-operative relation to the computer, but is not directly connected thereto when the computer is placed on the stand, so that the computer can be readily separated from the state-controlling mechanism and removed from the stand to permit the substitution of a cam for carrying out a different schedule of computations.

18. In a typewriting and computing machine, the combination with computing mechanism, of state-controlling mechanism for carrying out a definite schedule of computations, and gear-actuated means operated by said state-controlling mechanism to indicate the state of the machine at all times.

19. In a typewriting and computing machine, the combination with computing mechanism, of state-controlling mechanism for carrying out a definite schedule of computations, and means operated by said state-controlling mechanism to disclose the entire schedule, the state of the machine, and the point in the schedule at which the machine is set.

20. In a typewriting and computing machine, the combination with computing mechanism, of state-controlling mechanism for carrying out a definite schedule of computations, an indicator band having a whole number of cycles of said schedule of computations represented upon it, connections from the state-controlling mechanism to the indicator band to feed the band step by step, and a pointer co-operating with the band to show the operator the particular point in the schedule at which the machine is set.

21. In a typewriting and computing machine, the combination with computing mechanism, of state-controlling mechanism for carrying out a definite schedule of computations, an indicator band having a whole number of cycles of said schedule represented upon it, pulleys supporting the indicator band, including a driving pulley, and connections from the state-controlling mechanism to the driving pulley to advance the band one stage of the schedule at each computing operation.

22. In a typewriting and computing machine, the combination with computing mechanism, of state-controlling mechanism for carrying out a definite schedule of computations, an indicator having a whole number of cycles of said schedule represented upon it for showing the operator the state of the machine, means for changing the state-controlling mechanism to carry out a different schedule, and means for changing the band correspondingly.

23. In a typewriting and computing machine, the combination with computing mechanism, of state-controlling mechanism for carrying out a definite schedule of computations, an indicator band having a whole number of cycles of said schedule represented upon it for showing the operator the state of the machine, means for changing the schedule of the state-controlling mechanism to carry out a cycle consisting of a different number of computations, means for changing the indicator band to provide one corresponding to the new schedule, and means for adjusting the feed of the indicator band to proportion the feeding steps to the number of operations in the cycle.

24. In a typewriting and computing machine, the combination with a machine stand, of a computer removably mounted on the stand, state-controlling mechanism including a removable schedule cam mounted on the stand, and removable state-indicating means mounted on the stand and connected for operation by the state-controlling mechanism, the arrangement being such that the state-controlling mechanism is located in co-operative relation to the computer, but is not directly connected thereto when the computer is placed on the stand, so that the computer can be readily separated from the state-controlling mechanism and removed from the stand to permit the substitution of a new cam and a new indicating means when it is desired to change the schedule of the machine.

25. In a typewriting and computing machine, the combination with a machine base having an inverted U-shaped portion at the front thereof, computing mechanism, and state-controlling mechanism for carrying out a definite schedule of computations, of state-indicating means operated by the state-controlling mechanism and comprising an indicator band arranged to exhibit the schedule of the machine through an extended opening in the upper surface of the inverted U-shaped portion of the machine base, a pulley having sprocket teeth for positively driving the band located within the inverted U-shaped portion of the base, a shaft for driving the pulley, and means for collapsing the shaft to permit the pulley to be moved axially of the shaft, so that the indicator band can be withdrawn from the pulley between the pulley and the front wall of the inverted U-shaped portion of the base.

26. In a typewriting and computing machine, the combination with denominational pin-bars and dial-wheels, of a general operator, a link connected to the general operator for reciprocation thereby, a second link operated by the first, means operatively connecting said links, an oscillatory arm operated by the second link, a pawl on the oscillatory arm, and state-controlling mechanism advanceable step by step by the pawl.

27. In a typewriting and computing machine, the combination with denominational pin-bars and dial-wheels, of a general operator, means connected to the general operator for reducing the extent of movement transmitted therefrom, an oscillatory arm operated by the motion-reducing means, a pawl on the oscillatory arm, and state-controlling mechanism advanceable step by step by the pawl.

28. In a typewriting and computing machine, the combination with computing mechanism, of state-controlling mechanism therefor, comprising a schedule cam and a ratchet-wheel for driving the cam step by step, a bevel gear also driven by the ratchet-wheel, a second bevel gear driven by the first, a horizontal shaft driven by the second bevel gear and extending to the front of the machine, and state-indicating means at the front of the machine, driven by the horizontal shaft.

FREDERICK U. CONARD.